«12» United States Patent
Yamada et al.

«10» Patent No.: US 11,543,812 B2
«45» Date of Patent: Jan. 3, 2023

«54» SIMULATION DEVICE, PRESS SYSTEM, SIMULATION METHOD, PROGRAM, AND RECORDING MEDIUM

«71» Applicant: KOMATSU INDUSTRIES CORPORATION, Kanazawa (JP)

«72» Inventors: Yukihiro Yamada, Kanazawa (JP); Hideshi Futagi, Kanazawa (JP)

«73» Assignee: KOMATSU INDUSTRIES CORPORATION, Ishikawa (JP)

«*» Notice: Subject to any disclaimer, the term of this patent is extended or adjusted under 35 U.S.C. 154(b) by 419 days.

«21» Appl. No.: 16/643,142

«22» PCT Filed: Dec. 13, 2018

«86» PCT No.: PCT/JP2018/045859
§ 371 (c)(1),
(2) Date: Feb. 28, 2020

«87» PCT Pub. No.: WO2019/146302
PCT Pub. Date: Aug. 1, 2019

«65» Prior Publication Data
US 2020/0348657 A1    Nov. 5, 2020

«30» Foreign Application Priority Data

Jan. 29, 2018    (JP) .............................. JP2018-012485

«51» Int. Cl.
*G05B 19/418* (2006.01)
*B21D 43/00* (2006.01)
*B21D 43/05* (2006.01)

«52» U.S. Cl.
CPC ..... *G05B 19/41885* (2013.01); *B21D 43/003* (2013.01); *B21D 43/055* (2013.01); *G05B 19/41815* (2013.01)

«58» Field of Classification Search
None
See application file for complete search history.

«56» References Cited

U.S. PATENT DOCUMENTS 5,970,763 A    10/1999    Takayama
7,873,431 B2*   1/2011    Takahashi .............. B21D 43/05
                                                      700/206

(Continued)

FOREIGN PATENT DOCUMENTS

CN    204035380 U    12/2014
CN    205519348 U    8/2016

(Continued)

OTHER PUBLICATIONS

Hoffmann, H., and M. Kohnhäuser. "Strategies to optimize the part transport in crossbar transfer presses." CIRP Annals 51.1 (2002) : 27-32. (Year: 2002).*

(Continued)

*Primary Examiner* — Carlos R Ortiz Rodriguez
«74» *Attorney, Agent, or Firm* — Global IP Counselors, LLP

«57»    ABSTRACT

A simulation device has a simulation unit and a coordinate acquisition unit. The simulation unit simulates the operations of press devices and the operations of feeder devices that transport a workpiece between the press devices. The coordinate acquisition unit acquires a locus of a plurality of predetermined positions in the width direction of the feeder devices from simulation.

14 Claims, 13 Drawing Sheets

(56) References Cited

U.S. PATENT DOCUMENTS

| | | | |
|---|---|---|---|
| 9,061,529 B2* | 6/2015 | Fuchioka | B41J 11/007 |
| 2015/0151431 A1 | 6/2015 | Suyama et al. | |
| 2015/0294044 A1 | 10/2015 | Schaer | |
| 2017/0259434 A1 | 9/2017 | Takeda | |

FOREIGN PATENT DOCUMENTS

| | | |
|---|---|---|
| JP | 5-76630 U | 10/1993 |
| JP | 9-216029 A | 8/1997 |
| JP | 2005-211935 A | 8/2005 |
| JP | 2008-142724 A | 6/2006 |
| JP | 2011-131223 A | 7/2011 |
| JP | 2016-500882 A | 1/2016 |
| JP | 2017-164752 A | 9/2017 |
| WO | 2008/087867 A1 | 7/2008 |
| WO | 2011/074616 A1 | 6/2011 |
| WO | 2014/013605 A | 1/2014 |

OTHER PUBLICATIONS

Verner, Igor M. "Robot manipulations: Asynergy of visualization, computation and action for spatial instruction." International Journal of Computers for Mathematical Learning 9.2 (2004): 213-234. (Year: 2004).*

Groß mann, Knut, and Hajo Wiemer. "State and potentials of the "Virtual Forming Press"." Production Engineering 2.3 (2008): 285-292. (Year: 2008).*

Nia, Nima Khansari, Fredrik Danielsson, and Bengt Lennartson. "Efficient geometrical simulation and virtual commissioning performed in stamping." Proceedings of 2012 IEEE 17th International Conference on Emerging Technologies & Factory Automation (ETFA2012). IEEE, 2012. (Year: 2012).*

Nia, Nima Khansari. Efficient Simulation and Optimization for Tandem Press Lines. Chalmers Tekniska Hogskola (Sweden), 2012. (Year: 2012).*

Glorieux, Emile, et al. "Simulation-based time and jerk optimisation for robotic press tending." 29th European simulation and modelling conference, EUROSIS. 2015. (Year: 2015).*

The Office Action for the corresponding Japanese application No. 2018-012485, dated Oct. 12, 2021.

The International Search Report for the corresponding international application No. PCT/JP2018/045859, dated Mar. 5, 2019.

The Office Action for the corresponding Chinese application No. 201880059712.7, dated Mar. 1, 2021.

* cited by examiner

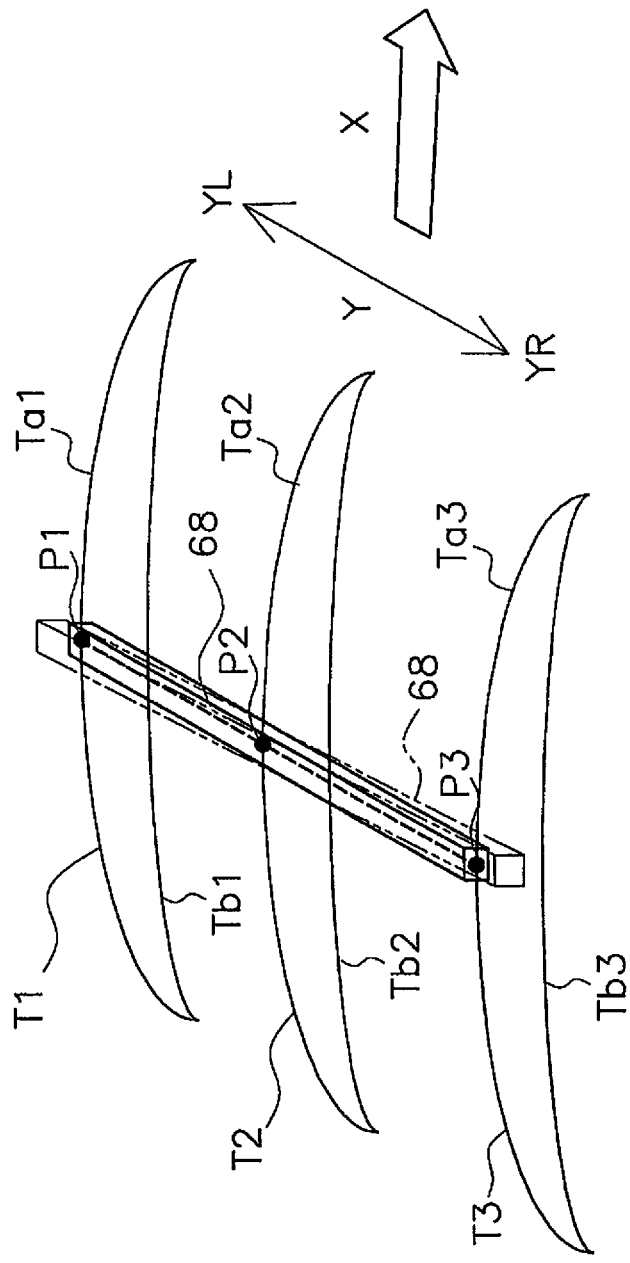
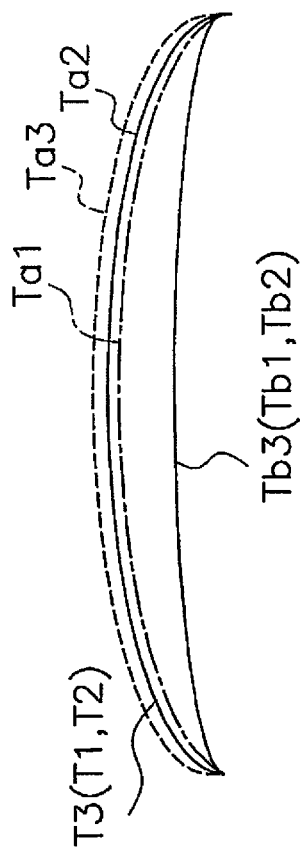
FIG. 7A
FIG. 7B

| | MOTION | | | | | | |
|---|---|---|---|---|---|---|---|
| | TRANSPORT MOTION | | | TILTING (INCLINATION) MOTION | | | |
| TIME | FIRST SHAFT | SECOND SHAFT | THIRD SHAFT | FOURTH SHAFT | FIFTH SHAFT | SIXTH SHAFT | |
| 0 | 0 | 30 | 90 | 0 | 0 | 0 | |
| 0.03 | 0 | 29 | 89 | 2 | 1 | 1 | |
| 0.06 | 3 | 28 | 88 | 3 | 1 | 2 | |
| 0.09 | 4 | . | . | 5 | 2 | 4 | |
| 0.12 | . | . | . | . | . | . | |
| . | . | . | . | . | . | . | |
| . | . | . | . | . | . | . | |
| . | . | . | . | . | . | . | |
| 3.75sec | | | | | | | |

FIG. 8

| TIME | TILTING (INCLINATION) MOTION | | |
|---|---|---|---|
| | FIRST TILTING ANGLE | SECOND TILTING ANGLE | THIRD TILTING ANGLE |
| 0 | 0 | 0 | 0 |
| 0.25 | 5 | 0 | 5 |
| 0.5 | 5 | 0 | 5 |
| 0.75 | 7 | 0 | 5 |
| 1 | | | |
| . | | | |
| . | | | |
| . | | | |
| 3.75sec | | | |

SIMULATION DEVICE, PRESS SYSTEM, SIMULATION METHOD, PROGRAM, AND RECORDING MEDIUM

CROSS-REFERENCE TO RELATED APPLICATIONS

This application is a U.S. National stage application of International Application No. PCT/JP2018/045859, filed on Dec. 13, 2018. This U.S. National stage application claims priority under 35 U.S.C. § 119(a) to Japanese Patent Application No. 2018-012485, filed in Japan on Jan. 29, 2018, the entire contents of which are hereby incorporated herein by reference.

BACKGROUND

Field of the Invention

The present invention relates to a simulation device, a press system, a simulation method, a program, and a recording medium.

Background Information

Recently, tandem press lines have been used, for example, in forming automobile bodies and the like. In a tandem press line, a plurality of press devices are installed side by side and a feeder device (transport device) is provided for transporting a workpiece between each of the press devices.

In order to make a mold that is mounted on a press device, an interference curve is generally used as a means for a user to confirm the presence of interference. An interference curve is a locus acquired by subtracting the press stroke locus from the locus of the feeder device and can be derived from the locus of the feeder device and the stroke locus of the press device.

In a mechanical press device in which the motions are fixed, interference curves that depict the relationship between the press devices and the feeder device are derived for each motion, and the mold is designed so as not to interfere with the feeder by designing the mold in a shape that can be kept to the inside of the interference curve.

However, because the devices are equipped with free motion functionality due to servo press devices and servo feeder devices, free motion loci now need to be made by the user. By providing a function for outputting locus data with a simulation tool that creates free motions, the user can perform an interference confirmation process in the same way as described above by being able to make the interference curve from the locus data.

SUMMARY

While it is possible to make the locus data even when a motion has changed by utilizing the simulation tool, it has become difficult to confirm interference because the movements have become complex due to the multiple types of feeder devices.

An object of the present invention is to provide a simulation device with which interference confirmation can be performed easily, and a press system, a simulation method, a program, and a recording medium.

A simulation device according to a first aspect has a simulation unit and an acquiring unit. The simulation unit simulates the operations of press devices for performing pressing on a workpiece, and the operation of a transport device for transporting the workpiece between the press devices. The acquiring unit acquires a locus of a plurality of predetermined positions in the width direction of the transport device from the simulation.

A press system according to a second aspect is provided with press devices, a transport device, and a simulation device. The press devices perform pressing on a workpiece. The transport device transports the workpiece between the press devices. The simulation device has a simulation unit and an acquiring unit. The simulation unit simulates the operations of press devices and the operations of the transport device. The acquiring unit acquires a locus of a plurality of predetermined positions in the width direction of the transport device from the simulation.

A simulation method according to a third aspect is provided with a simulation step and an acquiring step. The simulation step includes simulating the operations of press devices for performing pressing on a workpiece and the operations of a transport device for transporting the workpiece between the press devices. The acquiring step includes acquiring a locus of a plurality of predetermined positions in the width direction of the transport device from the simulation.

A program according to a fourth aspect is a program for causing a computer to execute a simulation step and an acquiring step. The simulation step includes simulating the operations of press devices for performing pressing on a workpiece and the operations of a transport device for transporting the workpiece between the press devices. The acquiring step includes acquiring a locus of a plurality of predetermined positions in the width direction of the transport device from the simulation.

According to the present invention, a simulation device with which interference confirmation can be performed easily, and a press system, a simulation method, a program, and a recording medium can be provided.

BRIEF DESCRIPTION OF DRAWINGS

FIG. 7A is a perspective view of the loci of a transport bar while the transport bar is tilted when the workpiece is moved in the feeder device of FIG. 3, and FIG. 7B is a side view seen in the width direction of FIG. 7A.

FIG. 8 is a table of transport motions and tilting (inclination) motions of the feeder device of FIG. 3.

DESCRIPTION OF EMBODIMENTS

A press system of the present invention will be explained with reference to the drawings.

<1. Configuration>

(1-1. Outline of Press System 1)

Figure 1:
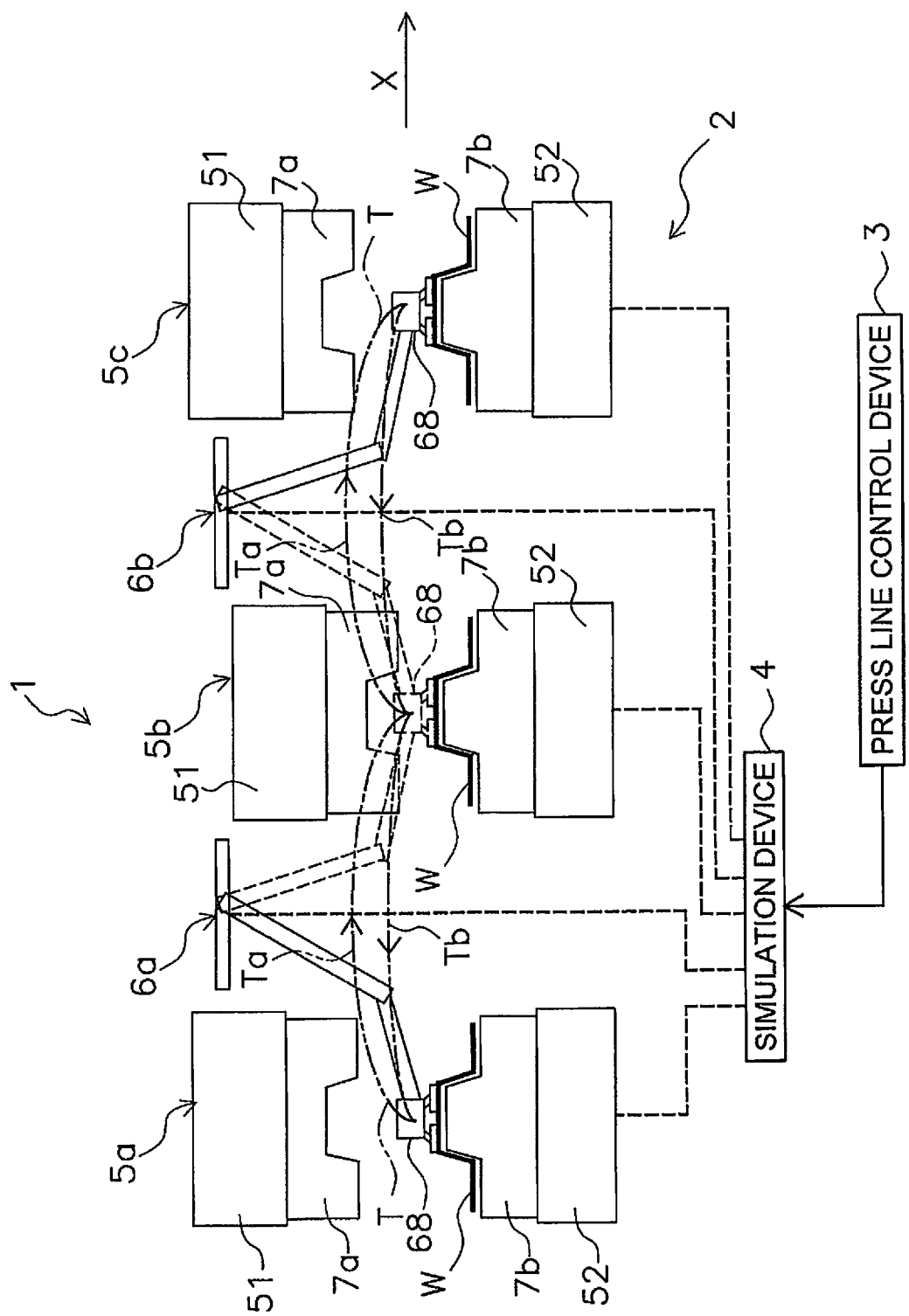
FIG. 1 is a schematic view of a press system of an embodiment according to the present invention.

FIG. 1 is a schematic view of a configuration of a press system 1 of an embodiment according to the present invention.

The press system 1 of the present embodiment is provided with a press line 2 and a simulation device 3. The press line 2 performs pressing in each step and transports a workpiece W between each step. The simulation device 3 performs simulations on the operations of the press line 2. The transportation direction of the workpiece W is depicted as X.

The press line 2 is a tandem press line and is provided with a press line control device 4, a plurality of press devices 5a, 5b, 5c (described as press devices 5 when not distinguishing between the press devices), and a plurality of feeder devices 6a, 6b (described a feeder devices 6 when not distinguishing between the feeder devices).

(1-2. Press Line Control Device 4)

Figure 2:
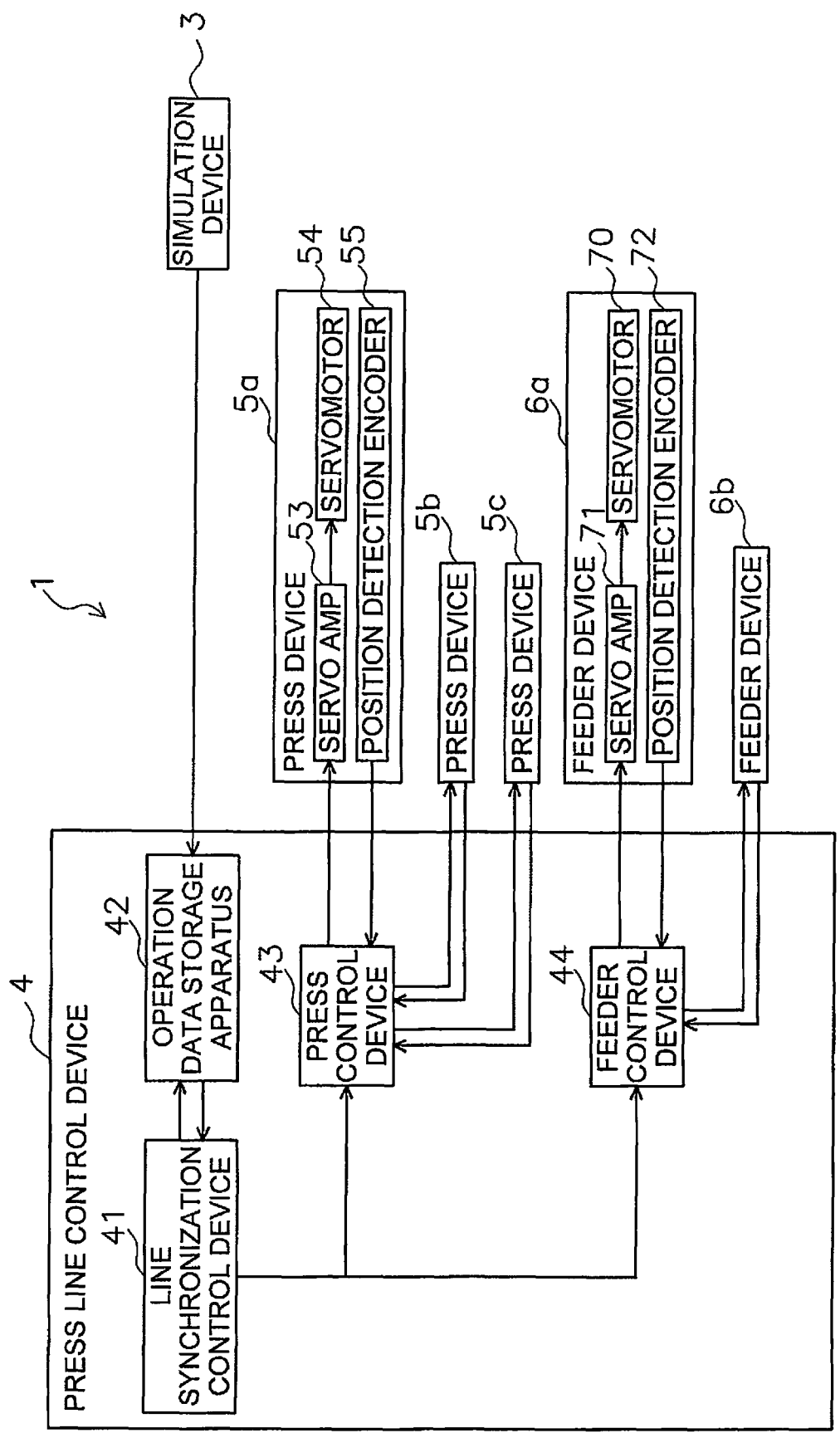
FIG. 2 is a control block of the press system of FIG. 1.

FIG. 2 is a control block of the press system 1.

The press line control device 4 has a line synchronization control device 41, an operation data storage apparatus 42, a press control device 43, and a feeder control device 44. The line synchronization control device 41 synchronizes the press devices 5a, 5b, 5c and the feeder devices 6a, 6b in the press line 2. The operation data storage apparatus 42 stores a plurality of motions of the press devices 5 and the feeder devices 6. The press control device 43 controls the press devices 5a, 5b, 5c. Specifically, the press control device 43 drives a servomotor 54 by transmitting commands to a servo amp 53, to control the pressing.

The feeder control device 44 controls the feeder devices 6a, 6b. Specifically, the feeder control device 44 causes servomotors 70 to be driven by transmitting commands to a servo amp 71 so that a workpiece W is transported between the press devices 5.

When a predetermined motion stored in the operation data storage apparatus 42 is selected by a worker, the press control device 43 controls the press devices 5a, 5b, 5c so as to be operated with the selected predetermined motions, and the feeder control device 44 controls the feeder devices 6a, 6b so as to be operated with the selected predetermined motions.

(1-3. Press Devices 5)

Each of the press devices 5a, 5b, 5c has a slide 51, a bolster 52, the servo amp 53, the servomotor 54, and a position detection encoder 55 as illustrated in FIGS. 1 and 2. An upper mold 7a is attached to the lower surface of the slide 51. A lower mold 7b is placed on the upper surface of the bolster 52. By driving the servomotor 54, the slide 51 moves up and down relative to the bolster 52 and pressing is performed between the upper mold 7a and the lower mold 7b.

The servo amp 53 drives the servomotor 54 in accordance with commands from the press control device 43. The position detection encoder 55 detects the position of the servomotor 54 and provides feedback about the position to the press control device 43. The servo amp 53, the servomotor 54, and the position detection encoder 55 of the press devices 5b and 5c are omitted in FIG. 2. In addition, when a plurality of servomotors are present in each of the press devices 5a, 5b, 5c, the servomotor 54, the servo amp 53, and the position detection encoder 55 are indicated collectively as a plurality of devices.

(1-4. Feeder Devices)

Figure 3:
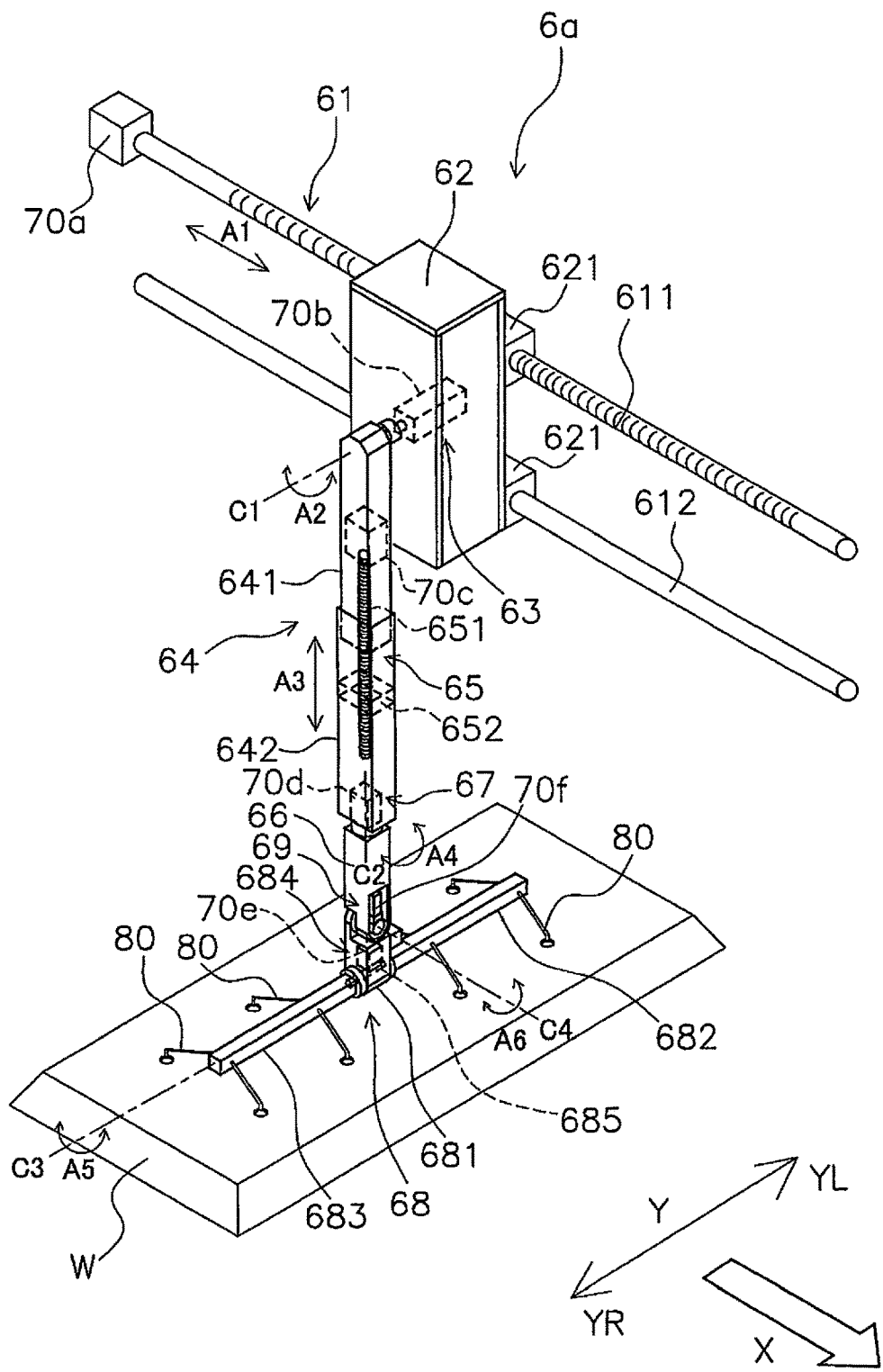
FIG. 3 is a perspective view of a feeder device of FIG. 1.

The structures of the feeder device 6a and the feeder 6b are the same and the feeder devices will be explained using the feeder device 6a as an example. FIG. 3 is a perspective view of the feeder 6a. In FIG. 3, the width direction Y perpendicular to the transportation direction X is depicted, and the left direction facing the transportation direction X is YL and the right direction facing the transportation direction X is YR.

The feeder device 6a has a slide mechanism 61, and arm support unit 62, a rotating unit 63, a first arm 64, an extension/contraction unit 65, a second arm 66, a rotating unit 67, a transport bar 68, and a rotating unit 69.

The slide mechanism 61 is disposed between the press device 5a and the press device 5b. The slide mechanism 61 has a ball screw 611, a guide 612, and a servomotor 70a. The ball screw 611 extends along the transportation direction X and from the press device 5a toward the press device 5b. The guide 612 has a cylindrical shape and is disposed parallel to the ball screw 611 and below the ball screw 611. The servomotor 70a is connected to one end of the ball screw 611 via a speed reducer or the like, and rotates the ball screw 611.

The arm support unit 62 is a box-shaped member and rotatably supports the first arm 64. A pair of up and down blocks 621 are provided on a side surface in the left direction YL side of the arm support unit 62. A through-hole is formed in the transportation direction X in the upper block 621 and the inside surface of the through-hole is formed in a screw shape. The ball screw 611 is inserted through the through-hole of the upper block 621 and is screwed to the screw shape on the inside surface of the through-hole. In addition, a through-hole is formed along the transportation direction X in the lower block 621 and the guide 612 is inserted through said through-hole. When the ball screw 611 rotates due to the rotation of the servomotor 70a, the arm support unit 62 is able to move to the upstream side or the downstream side in the transportation direction X while being guided by the guide 612 (see arrow A1).

The rotating unit 63 is provided in the arm support unit 62 and rotates the first arm 64. The rotating unit 63 has the servomotor 70b and an unillustrated speed reducing unit. The servomotor 70b is fixed inside the arm support unit 62. The servomotor 70b is disposed so that the drive shaft thereof extends in the right direction YR.

The first arm 64 is fixed to the drive shaft of the servomotor 70b via the speed reducing unit at an upper end part of the first arm 64. The first arm 64 rotates around a center axis C1 (see arrow A2) that extends in the width direction Y.

The first arm 64 is configured to allow for extension and contraction and has a hollow first portion 641 and a hollow second portion 642. The upper end part of the first portion 641 is fixed to the drive shaft of the servomotor 70b via the speed reducing unit. The lower end part of the first portion 641 is fitted inside the upper end part of the second portion 642.

The extension/contraction unit 65 is provided in the first arm 64 and extends and contracts the first arm 64. The extension/contraction unit 65 has a ball screw 651, a servomotor 70c, and a fitting nut 652. The ball screw 651 is disposed along the longitudinal direction of the first arm 64 inside the first arm 64. The ball screw 651 is disposed so as to cross between the first portion 641 and the second portion 642. The servomotor 70c is fixed to the inside of the first portion 641. The drive shaft of the servomotor 70c is coupled to the ball screw 651 via a speed reducing unit. The fitting nut 652 is fixed to the inside of the second portion 642 so that a through-hole of the fitting nut 652 extends along the longitudinal direction of the first arm 64. The ball screw 651 is inserted through the through-hole of the fitting nut 652 and the ball screw 651 forms a threaded engagement with a screw shape formed on the inside surface of the through-hole.

Consequently, when the ball screw 651 rotates due to the driving of the servomotor 70c, the fitting nut 652 and the second portion 642 move relative to the first portion 641 and the first arm 64 can be extended and contracted (see arrow A3).

The second arm 66 is disposed along the longitudinal direction of the first arm 64 at the bottom end of the first arm 64. The longitudinal direction of the second arm 66 matches the longitudinal direction of the first arm 64.

The rotating unit 67 is provided in the second portion 642 of the first arm 64 and rotates the second arm 66. The rotating unit 67 has the servomotor 70d and an unillustrated speed reducing unit. The servomotor 70d is fixed to the inside of the second portion 642. The servomotor 70d is disposed so that the drive shaft thereof follows the longitudinal direction of the first arm 64, and the drive shaft extends downward.

The second arm 66 is fixed to the drive shaft of the servomotor 70d via the speed reducing unit at an upper end of the second arm 66. The second arm 66 is able to rotate around the longitudinal direction thereof as a center axis C2 (see arrow A4).

The transport bar 68 is disposed along the width direction Y at the lower end of the second arm 66. Holding tools 80 for holding the workpiece W are removably attached to the transport bar 68. The transport bar 68 has a coupling unit 681, a left bar 682, a right bar 683, and a bar rotating unit 684. The coupling unit 681 is coupled to the lower end of the second arm 66. The left bar 682 is rotatably attached to the left direction YL side of the coupling unit 681. The right bar 683 is rotatably attached to the right direction YR side of the coupling unit 681. The left bar 682 and the right bar 683 are coupled together with a coupling shaft 685. The longitudinal directions of the left bar 682, the right bar 683, and the coupling shaft 685 rotate around a center axis C3.

The bar rotating unit 684 is disposed inside the coupling unit 681 and has a servomotor 70e and a speed reducing unit. The drive shaft of the servomotor 70e meshes with the screw shape of the circumference of the coupling shaft 685 via the speed reducing unit. The coupling shaft 685 rotates due to the rotation of the servomotor 70e and the left bar 682 and the right bar 683 joined to the coupling shaft 685 also rotate (see arrow A5).

The rotating unit 69 is provided in the second arm 66. The coupling unit 681 of the transport bar 68 is rotatably coupled at a lower end part of the second arm 66 so as to be able to rotate around a center axis C4 that extends in the direction along the transportation direction X. The rotating unit 69 has a servomotor 70f and a speed reducing unit. The drive shaft of the servomotor 70f is fixed to the upper end part of the coupling unit 681 via the speed reducing unit. The transport bar 68 rotates, due to the driving of the servomotor 70f, around the center axis C4 that extends in the transportation direction X.

As illustrated in the block diagram of FIG. 2, the feeder device 6a has the servomotors 70 (specifically, servomotors 70a-70f which are described as servomotors 70 when referred to collectively), the servo amp 71, and a position detection encoder 72. The servo amp 71 drives the servomotors 54 in accordance with commands from the feeder control device 44. The position detection encoder 72 detects the positions of the servomotors 70 and provides feedback about the positions back to the feeder control device 44. Specifically, a servo amp and a position detection encoder is provided for each servomotor 70a-70f. The servo amp 71, the servomotor 70, and the position detection encoder 72 for the feeder device 6b are omitted in FIG. 2.

(1-5. Simulation Device)

Figure 4:
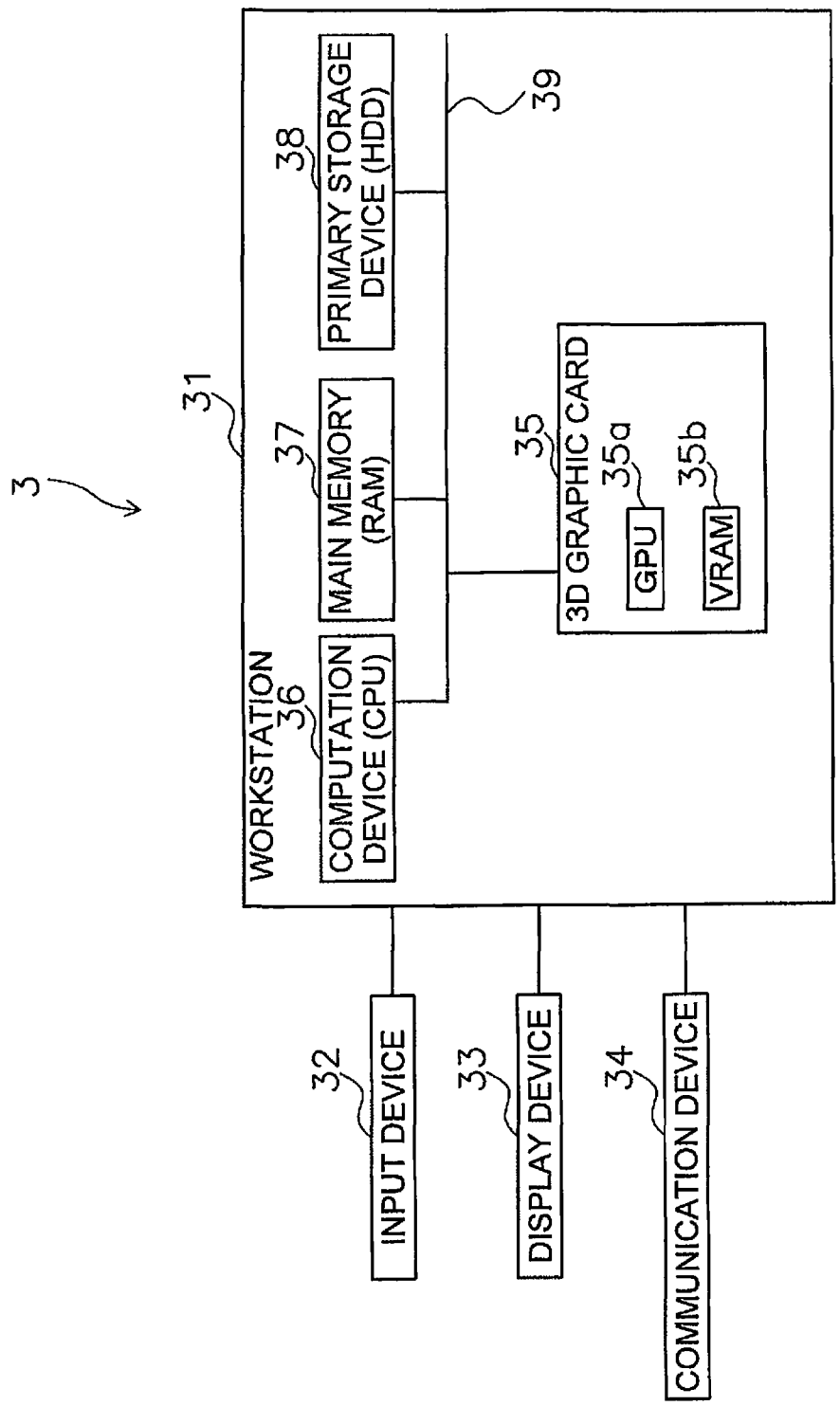
FIG. 4 is a block diagram of a configuration of the simulation device of FIG. 1.

FIG. 4 is a block diagram of a configuration of the simulation device 3. The simulation device 3 has a workstation 31, an input device 32, a display device 33, and a communication device 34. The workstation 31 performs simulations of the press line 2 and acquires coordinates of designated predetermined positions.

The input device 32 includes, for example, a keyboard and a mouse, and a worker inputs various settings while viewing the display device 33.

Figure 5C:
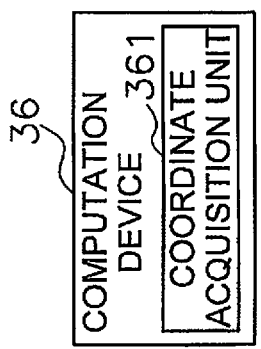
FIG. 5C is a functional block of a computing device of the simulation device in FIG. 4.
Figure 5B:
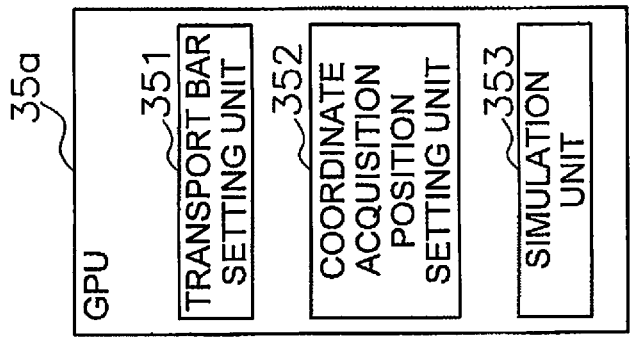
FIG. 5B is a functional block of a GPU of the simulation device in FIG. 4.
Figure 5A:
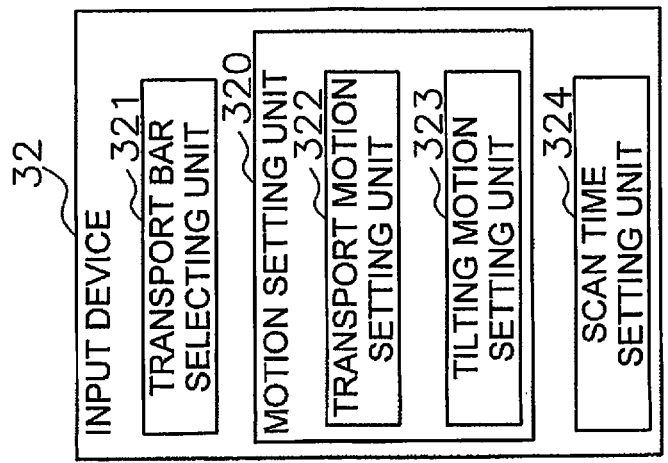
FIG. 5A is a functional block of an input device of the simulation device in FIG. 4.

FIG. 5A is a functional block of the input device 32. The input device 32 has a transport bar selecting unit 321, a motion setting unit 320, and a scan time setting unit 324. The transport bar selecting unit 321 selects the desired transport bar 68 from among a plurality of types of stored transport bars 68.

The motion setting unit 320 sets the motions of the press devices 5a, 5b, 5c and the feeder devices 6a, 6b. The motion setting unit 320 has a transport motion setting unit 322 and a tilting motion setting unit 323. The transport motion setting unit 322 sets the transportation motions which are changes in the positions of the transport bars 68 of the feeder devices 6a, 6b. The tilting motion setting unit 323 sets the tilting motions which are changes in the inclinations of the transport bars 68 of the feeder devices 6a, 6b. The inclinations of the transport bars 68 are set according to the rotation position in the arrow A4 direction, the rotation position in the arrow A5 direction, and the rotation position in the arrow A6 direction. The scan time setting unit 324 sets scan times when performing a simulation. The simulations are performed at each set scan time. That is, when the scan time is set to 3 ms, the states at each 3 ms are simulated.

The display device 33 illustrated in FIG. 4 is, for example, a monitor or the like, and displays the loci of the left end position, the center position, and the right end position of the transport bar 68. The communication device 34 transmits data at each scan time of the position coordinates of the left end position, the center position, and the right end position of the transport bar 68, to an external apparatus.

(1-6. Workstation 31)

As illustrated in FIG. 4, the workstation 31 has a 3D graphic card 35, a computation device 36, a main memory 37, a primary storage device 38, and a system bus 39. The 3D graphic card 35 has a graphics processing unit (GPU) 35a and a video RAM (VRAM) 35b and performs three-dimensional image computation operations and three-dimensional model coordinate calculations, and the like.

As illustrated in the functional block of FIG. 5B, the GPU 35a has a transport bar setting unit 351, a coordinate acquisition position setting unit 352, and a simulation unit 353. The transport bar setting unit 351 performs settings, in a simulation space, for attaching the type of transport bar 68 selected with the transport bar selecting unit 321 of the input device 32, to the lower end of the second arm 66 of the feeder devices 6a, 6b. The coordinate acquisition position setting unit 352 sets the left end position, the center position, and the right end position in the width direction Y of the set transport bar 68. The simulation unit 353 uses the transport bar 68 selected with the input device 32 to perform simulations of operations of the press line 2 with the set motions of the press devices 5a, 5b, 5c and the feeder devices 6a, 6b and the tilting of the transport bar 68.

The computation device 36 is a central processing unit (CPU) or the like and has a coordinate acquisition unit 361 as illustrated in the functional block diagram in FIG. 5C. The coordinate acquisition unit 361 acquires the coordinates of the left end position, the coordinates of the center position, and the coordinates of the right end position of the transport bar 68 from the simulation performed by the simulation unit 353 for each scan time set with the scan time setting unit 324.

A main memory 37 is a random access memory (RAM) or the like. The primary storage device 38 is a hard disk drive (HDD) or the like and stores the plurality of types of the transport bar 68 that can be selected, previously set motions of the press devices 5a, 5b, 5c, and previously set motions of the feeder devices 6a, 6b.

The system bus 39 connects the 3D graphic card 35, the computation device 36, the main memory 37, and the primary storage device 38.

(1-7. Locus of Transport Bar 68)

When explaining the transport of the workpiece W held in a state parallel to the width direction Y by the transport bar 68, between the press devices 5a, 5b, 5c, the transport bar 68 of the feeder device 6a transports the workpiece W while drawing the locus T represented by a chain double-dashed line.

A locus Ta above the locus T is the locus of the advancing when the workpiece W is removed from the upstream press device 5a and transported to the downstream press device 5b. A locus Tb below the locus T is the locus of the return when moving toward the workpiece W in the upstream press device 5a after the workpiece W has been placed on the lower mold 7b of the downstream press device 5b.

Figures 6A, 6B:
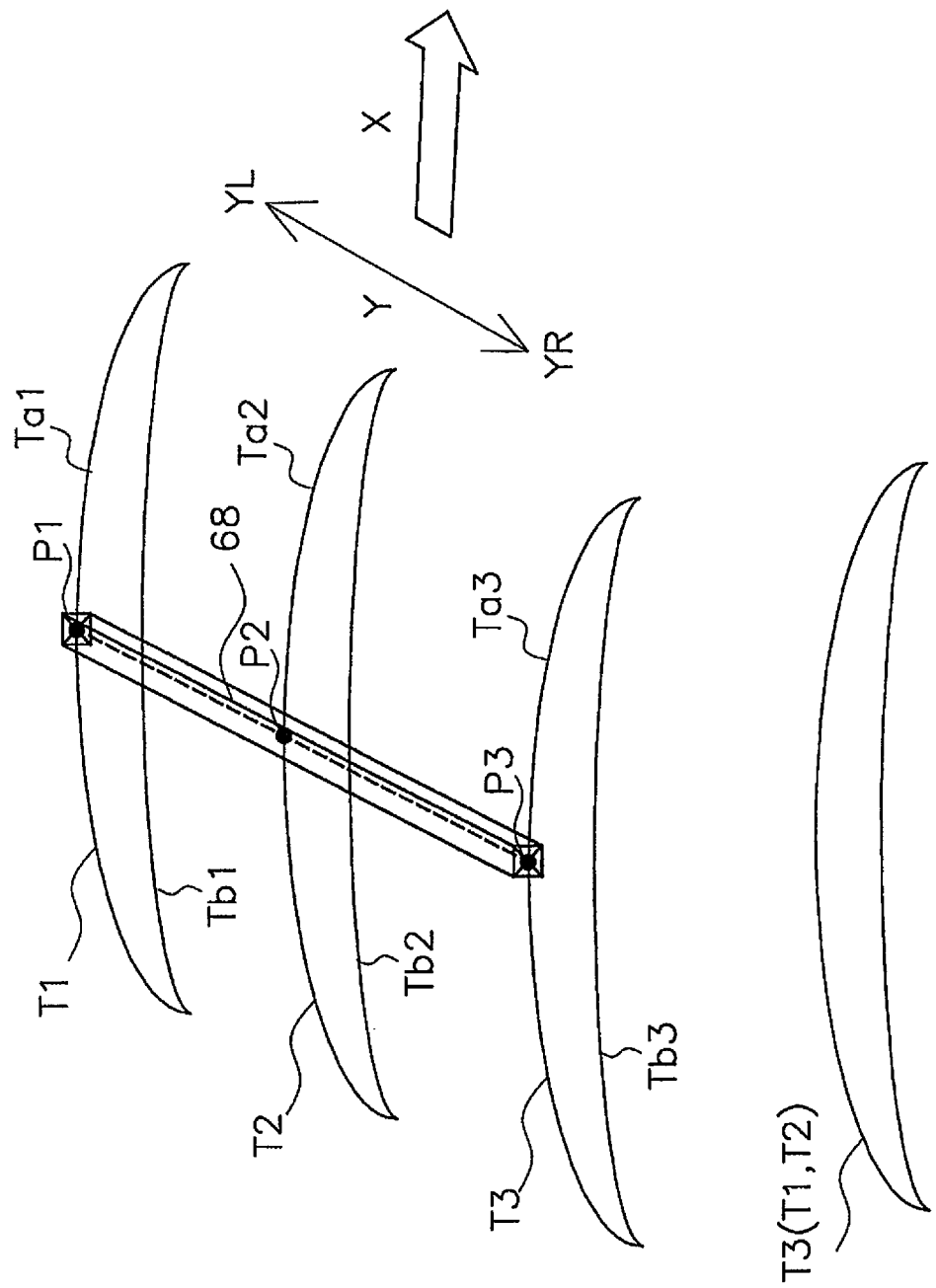
FIG. 6A is a perspective view of the loci of a transport bar when the transport bar is disposed parallel to the width direction when the workpiece is moved in the feeder device of FIG. 3.
FIG. 6B is a side view seen in the width direction of FIG. 6A.

FIG. 6A is a perspective view of the loci of the transport bar 68 while disposed parallel to the width direction Y when moving the workpiece W. FIG. 6B is a side view when viewing FIG. 6A along the width direction Y. When the transport bar 68 is disposed parallel to the width direction Y, the left end position P1, the center position P2, and the right end position P3 of the transport bar 68 all move along the locus at the same height. As a result, as illustrated in FIG. 6B, the locus T1 of the left end position P1, the locus T2 of the center position P2, and the locus T3 of the right end position P3 match each other in the side view. The advancing loci of the loci T1, T2, and T3 are respectively represented by Ta1, Ta2, and Ta3 and the return loci are respectively represented by Tb1, Tb2, and Tb3.

That is, when the transport bar 68 is disposed parallel to the width direction Y, interference with the press devices 5a, 5b, 5c or the molds (upper mold 7a and lower mold 7b) can be confirmed by confirming the position of the locus at any one point in the width direction Y of the transport bar 68.

FIG. 7A is a perspective view of the loci while the transport bar 68 is tilted when moving the workpiece W. FIG. 7B is a side view when viewing FIG. 7A along the width direction Y. The transport bar 68 along the width direction Y is represented by a chain double-dashed line in FIG. 7A.

The transport bar 68 is tilted so that the height of the right end position P3 thereof is higher than the center position P2, and the height of the left end position P1 is lower than the center position P2 while transporting the workpiece W. As a result, the advancing locus Ta1 (represented by the dashed line) at the left end position P1 is drawn lower than the advancing locus Ta2 (represented by the solid line) at the center position P2 and the advancing locus Ta3 (represented by the chain double-dashed line) of the right end position P3 is drawn higher than the advancing locus Ta2 of the center position P2 in the side view in FIG. 7B.

In this way, when the transport bar 68 is tilted, interference with the press devices 5a, 5b, 5c or the molds (upper mold 7a and lower mold 7b) can be confirmed by confirming the loci at both ends of the transport bar 68 as illustrated in FIGS. 7A and 7B.

<2. Operations>

Next, the operations of the press system 1 of an embodiment according to the present invention will be explained while explaining an example of the simulation method of the present invention at the same time.

Before performing output control of the abovementioned locus data of the transport bar 68, the operations of the press devices 5a, 5b, 5c and the feeder devices 6a, 6b are set by a worker as a condition for performing the simulation.

(2-1. Motion Settings)

The worker operates the transport motion setting unit 322 and the tilting motion setting unit 323 of the input device 32 and selects the motions of the press devices 5a, 5b, 5c and the feeder devices 6a, 6b stored in the primary storage device 38. The worker is able to adjust the selected motions.

FIG. 8 illustrates the states of the transport motions and tilting (inclination) motions of the feeder device 6a, and the states are stored in the primary storage device 38. Rotation positions based on times for each of the plurality of shafts are depicted in FIG. 8. An example of 16 spm is depicted in FIG. 8 when 1 stroke is completed in 3.75 s. In addition, at 0 s, the feeder devices 6a, 6b are disposed at standby positions between the press device 5a and the press device 5b.

The first shaft in FIG. 8 corresponds to the drive shaft of the servomotor 70a and depicts the rotation position of the servomotor 70a at each time. The position of the arm support unit 62 in the arrow A1 direction can be depicted with the rotation position of the servomotor 70a. The second shaft corresponds to the drive shaft of the servomotor 70b and depicts the rotation position of the servomotor 70b at each time. The position of the first arm 64 in the arrow A2 direction can be depicted with the rotation position of the servomotor 70b. The third shaft corresponds to the drive shaft of the servomotor 70c and depicts the rotation position of the servomotor 70c at each time. The length of the first arm 64 in the arrow A3 direction can be depicted with the rotation position of the servomotor 70c. The fourth shaft corresponds to the drive shaft of the servomotor 70d and depicts the rotation position of the servomotor 70d at each time. The position (rotation position of the transport bar 68 in a plan view) of the transport bar 68 in the arrow A4 direction can be depicted with the rotation position of the servomotor 70d. The fifth shaft corresponds to the drive shaft of the servomotor 70e and depicts the rotation position of the servomotor 70e at each time. The position (rotation position of the transport bar 68 in a plan view perpendicular to the width direction Y) of the transport bar 68 in the arrow A5 direction can be depicted with the rotation position of the servomotor 70e. The sixth shaft corresponds to the drive shaft of the servomotor 70f and depicts the rotation position of the servomotor 70f at each time. The position (rotation position of the transport bar 68 in a plan view perpendicular to the transportation direction X) of the transport bar 68 in the arrow A6 direction can be depicted with the rotation position of the servomotor 70f.

The values of the first, second and third shafts represent the transport motions which are changes in the positions of the transport bar 68 of the feeder devices 6a, 6b, and the fourth, fifth and sixth shafts represent the tilting motions which are changes in the inclination of the transport bar 68 of the feeder devices 6a, 6b.

Figure 9:
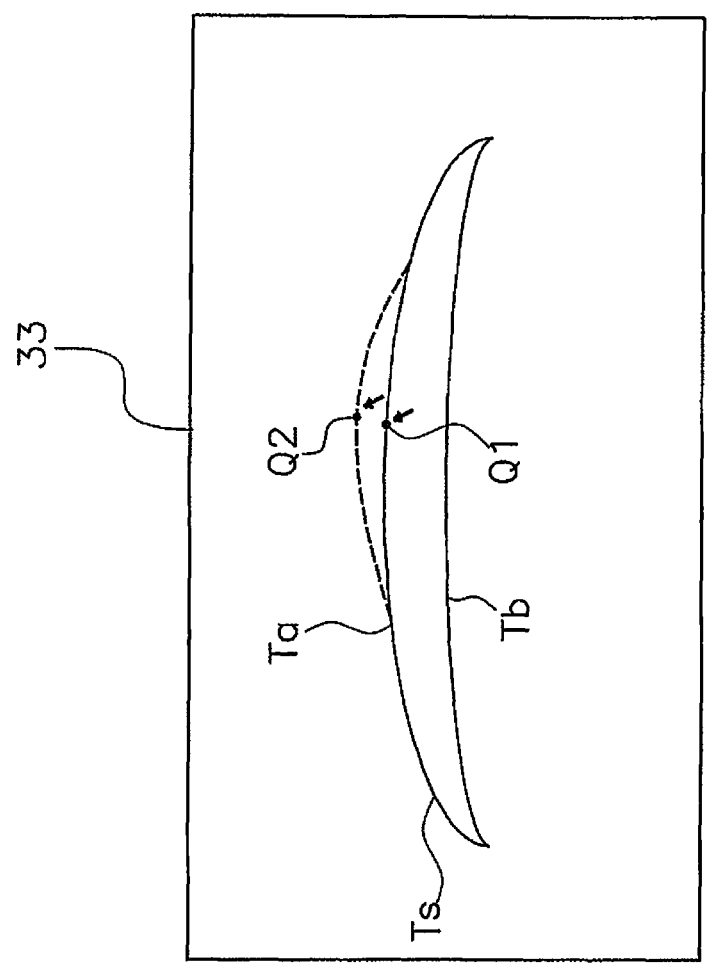
FIG. 9 illustrates a display screen of a display device based on a transport motion setting unit in the simulation device of FIG. 4.

FIG. 9 illustrates a display screen of the display device 33 based on the transport motion setting unit 322. A selected basic motion Ts is displayed on the display screen. The worker is able to change the basic motion to the motion of the dashed line by, for example, selecting position Q1 with the mouse and moving the position Q1 to the position Q2. When the worker changes the motion on the screen, a computation is performed by the computation device 36 and the values of the first, second and third shafts illustrated in FIG. 8 are changed so as to implement the changed motion. The operations with respect to the press devices 5a, 5b, 5c are the same as in the prior art and the explanation thereof is omitted.

Figures 10A, 10B, 10C, 10D:
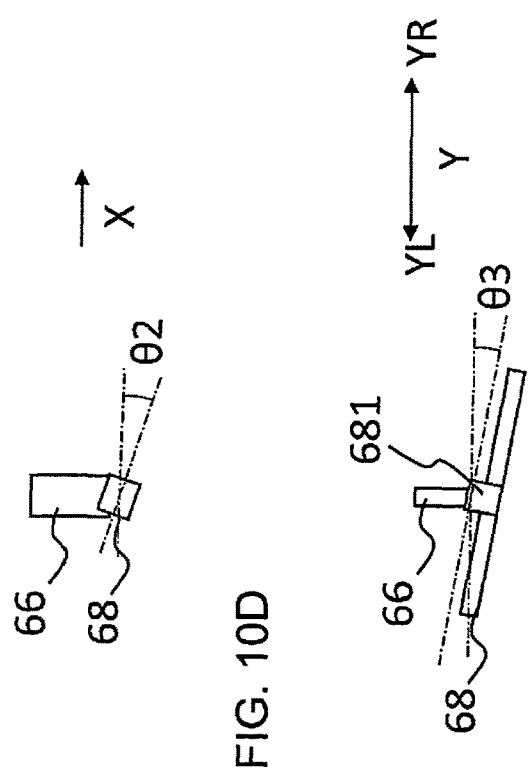
FIG. 10A illustrates a display screen of the display device based on the tilting motion setting unit in the simulation device of FIG. 4.
FIG. 10B is a schematic view for explaining a first tilting angle depicted in FIG. 10A.
FIG. 10C is a schematic view for explaining a second tilting angle depicted in FIG. 10B.
FIG. 10D is a schematic view for explaining a third tilting angle depicted in FIG. 10C.

Next, the worker operates the tilting motion setting unit 323 of the input device 32 and adjusts the inclination of the transport bar 68. FIG. 10A illustrates a display screen of the display device 33 based on the tilting motion setting unit 323. In FIG. 10A, three tilting angles (first tilting angle, second tilting angle, and third tilting angle) of the transport bar 68 can be inputted for each 0.25 s which is a larger interval than depicted in FIG. 8. The first tilting angle 81 is the tilting angle of the transport bar 68 in a plan view (arrow A4 in FIG. 3) with respect to the width direction Y as illustrated in FIG. 10B. The second tilting angle 82 is the tilting angle of the transport bar 68 with respect to the horizontal direction in a plan view (arrow A5) perpendicular to the width direction Y as illustrated in FIG. 10C. The third tilting angle θ3 is the tilting angle of the transport bar 68 with respect to the horizontal direction in a plan view (arrow A6) perpendicular to the transportation direction X as illustrated in FIG. 10D.

When the worker inputs a desired tilting angle on the display screen as illustrated in FIG. 10A, a computation is performed by the computation device 36 and the values of the fourth, fifth, and sixth shafts are changed in consideration of the values of the first, second, and third shafts that reflect the inputted tilting motions.

As described above, the operations of the feeder devices 6a, 6b are set in the simulation device 3.

(2-2. Locus Data Output)

Figure 11:
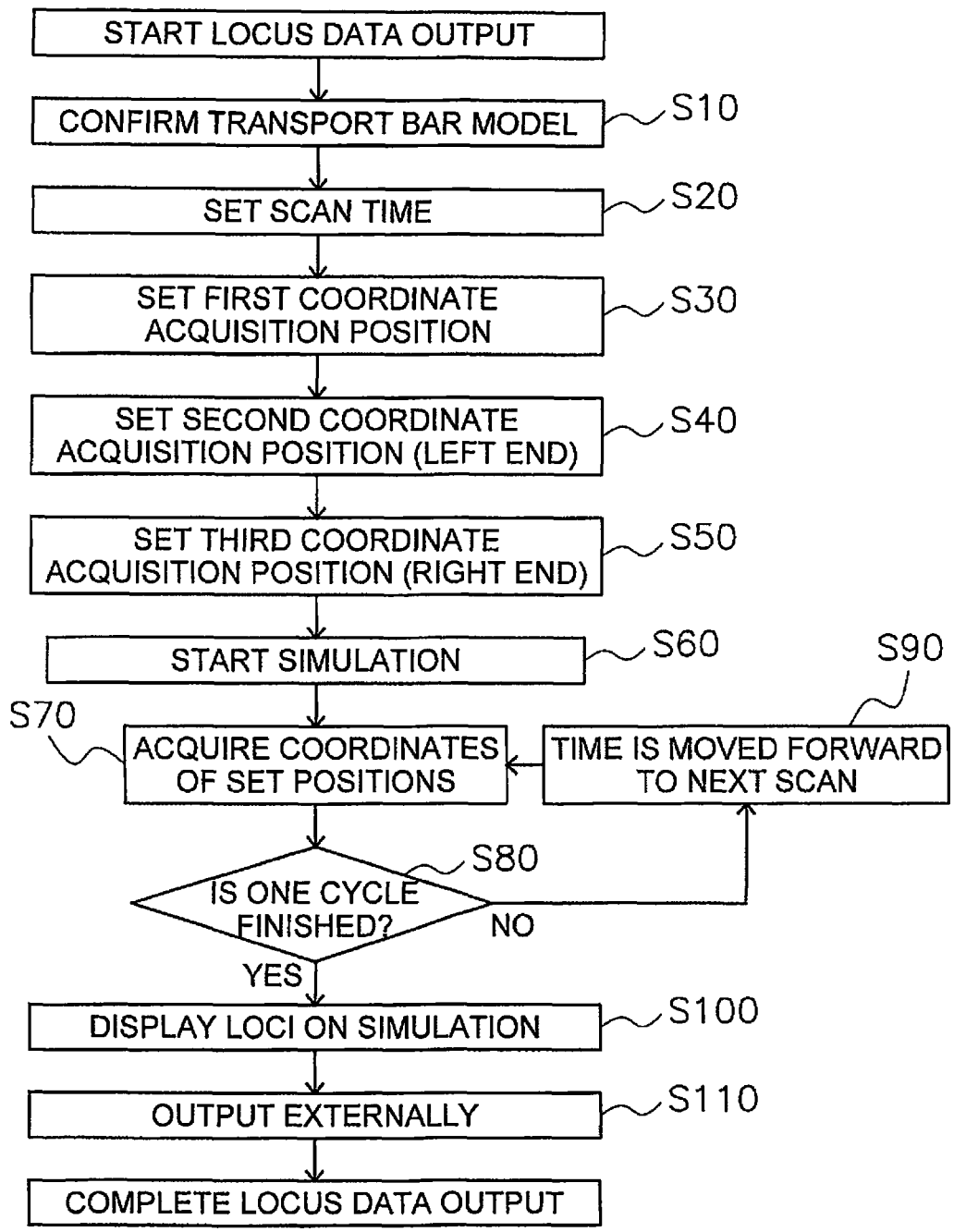
FIG. 11 is a flow chart of a locus data output operation that uses the simulation device of the present embodiment.

Next, the output of the locus data will be explained. FIG. 11 is a flow chart of a locus data output operation that uses the simulation device 3 of the present embodiment.

First, in step S10, the worker selects the desired transport bar 68 with the transport bar selecting unit 321 from a plurality of transport bar 68 models stored in the primary storage device 38.

Next, in step S20, the worker sets a desired scan time with the scan time setting unit 324. For example, the scan time is set to 3 ms.

Next, in step S30, the coordinate acquisition position setting unit 352 sets the center position P2 of the transport bar 68 as the first coordinate acquisition position of the selected transport bar 68.

Next, in step S40, the coordinate acquisition position setting unit 352 sets the left end position P1 of the transport bar 68 as the second coordinate acquisition position of the selected transport bar 68.

Next, in step S50, the coordinate acquisition position setting unit 352 sets the right end position P3 of the transport bar 68 as the third coordinate acquisition position of the selected transport bar 68.

Next, in step S60, a simulation of the operation of the press line 2 is started by the simulation unit 353.

Next, in step S70, the coordinate acquisition unit 361 acquires the coordinates of the set positions (left end position P1, center position, P2, and right end position P3) from the simulation unit 353.

Next, in step S80, if one cycle (one stroke (advancing locus and return locus)) is not finished, the control advances to step S90 and the time is moved forward to the next scan. In step S80, the coordinate acquisition unit 361 then acquires the coordinates of the left end position P1, the center position P2, and the right end position P3 for the next scan time (3 ms from the first scan). The acquired coordinates are stored in the primary storage device 38.

In step S80, when it is determined that one cycle is finished, the control advances to step S100, and the respective loci T1, T2, and T3 of the left end position P1, the center position P2, and the right end position P3 illustrated in FIG. 7 are displayed on the display device 33. At this time, the display device 33 displays the loci T1, T2, and T3 with the movements of the press devices 5a, 5b, 5c and the feeder devices 6a, 6b.

Next, in step S110, the coordinate data of the left end position P1, center position P2, and right end position P3 is outputted externally by the communication device 34.

The output of the locus data is completed with the above operation.

In this way, an interference curve can be calculated by computing the differences between the press curves of the press devices 5a and 5b and the locus data of the feeder devices 6a, 6b.

In the case of the present embodiment, the interference curves are acquired at the left end position P1, the center position P2, and the right end position P3.

Figure 12A:
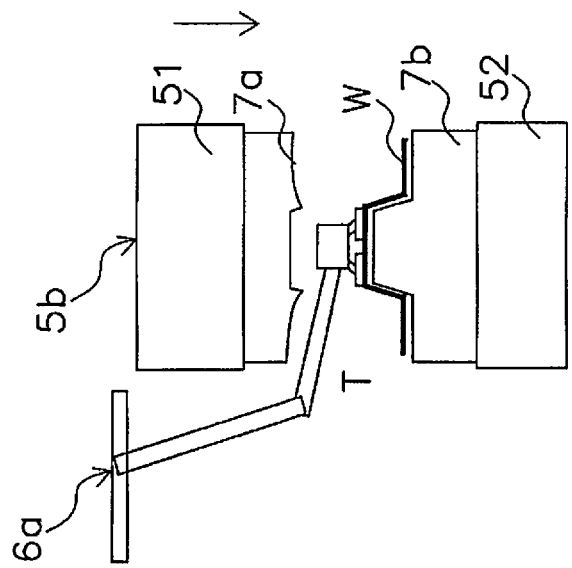
FIGS. 12A, B, and C are diagrams for explaining the review of a mold by the simulation device.
Figure 12B:
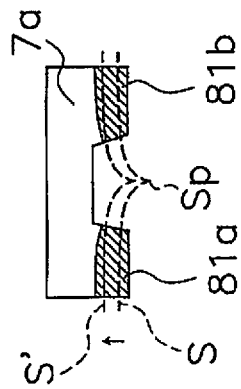

For example, as illustrated in FIG. 12A, by using the simulation device 3, when it is understood that the feeder device 6a interferes with the upper mold 7a at the right end position P3 during the lowering of the press device 5b (see dashed line T), the interference curve S (see FIG. 12B) is calculated by the worker. The lowest portion of the interference curve S is indicated as Sp. Because the interference curve S is drawn relative to the center of the transport bar 68 in the up-down direction, an interference region is produced up to the curve S' obtained by raising the interference curve S as far as the upper surface height of the transport bar 68 when the upper mold 7a is used. As illustrated in FIG. 12B, the design of the mold is revised so that the mold does not intrude into the interference curve S'. For example, if an interference portion 81a (shaded portion) and an interference portion 81b (shaded portion) are removed, it can be seen that there is no interference.

Figure 12C:
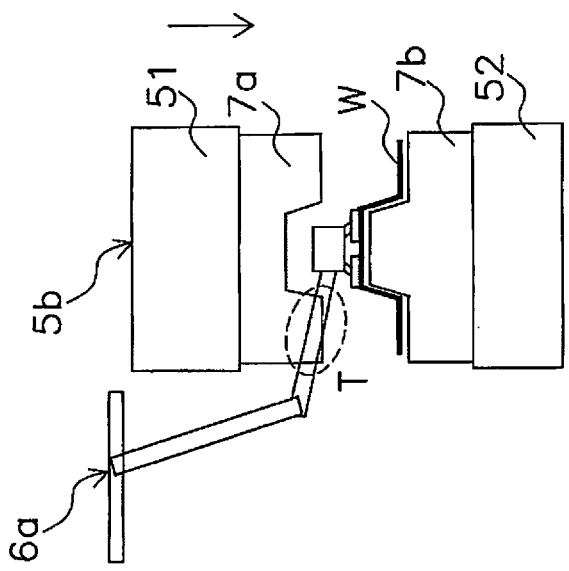

As illustrated in FIG. 12C, the simulation is performed again using the corrected mold and the mold can be actually fabricated after confirming that production can proceed without interference. When examining an interference region with the lower mold 7b, an interference region is produced with the lower mold 7b as far as the curve obtained by lowering the interference curve S as far as the height of the lower surface of holding tools 80 mounted to the transport bar 68.

Figure 13:
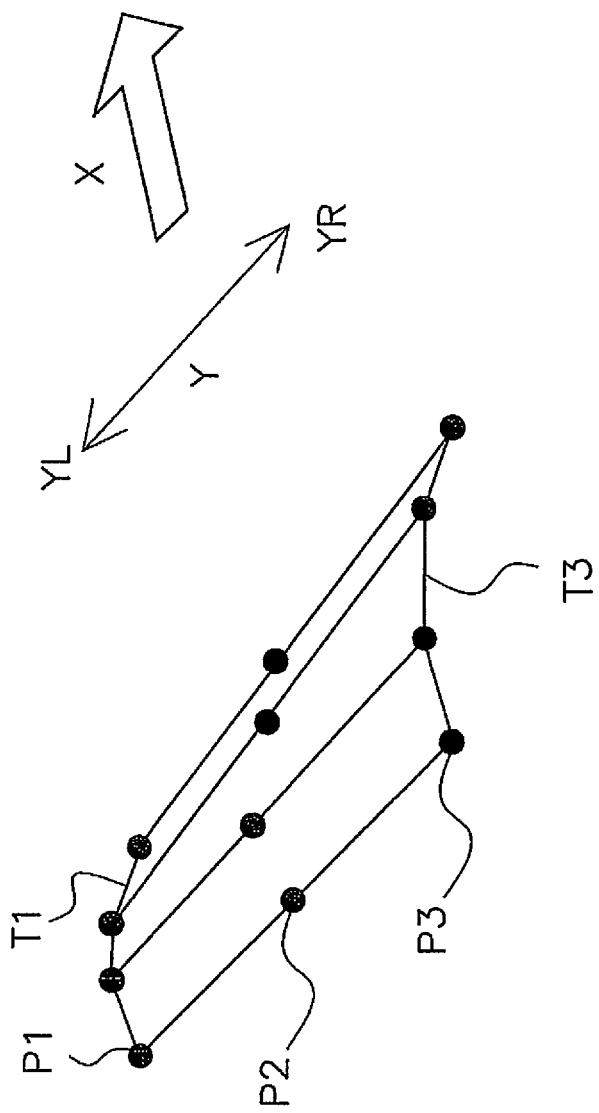
FIG. 13 illustrates an example of a three-dimensional locus display based on the output of the simulation device of FIG. 4.

In addition, as illustrated in FIG. 13, by linking the left end position P1 and the right end position P3 at the same points in time, a three-dimensional locus can be displayed whereby interference with the press devices 5a and 5b or the molds (upper mold 7a and lower mold 7b) can be easily confirmed.

<3. Characteristics>

(3-1)

The simulation device 3 of the present embodiment is provided with the simulation unit 353 and the coordinate acquisition unit 361 (example of acquiring unit). The simulation unit 353 simulates the operations of the press devices 5a, 5b, 5c and the feeder devices 6a, 6b (examples of transportation device) for transporting the workpiece W between the press devices 5a, 5b, 5c. The coordinate acquisition unit 361 acquires a locus of a plurality of predetermined positions in the width direction Y of the feeder devices 6a, 6b from the simulation.

As a result, when the workpiece W is transported, interference with the press devices 5a, 5b, 5c can be easily confirmed from the locus of the plurality of positions in the width direction Y of the feeder devices 6a, 6b even when the movements of the feeder devices 6a, 6b are complex (for example, when tilted with respect to the width direction Y).

(3-2)

In the simulation device 3 of the present embodiment, the plurality of predetermined positions include the left end position P1 and the right end position P3 (example of positions at both ends) in the width direction Y of the feeder devices 6a, 6b.

As a result, interference with the press devices 5a, 5b, 5c can be easily confirmed from the left end position P1 and the right end position P3.

(3-3)

The simulation device 3 of the present embodiment is further provided with the communication device 34 (example of output unit). The communication device 34 externally outputs the locus of a plurality of predetermined positions.

As a result, an interference curve can be calculated from the loci of the feeder devices 6a, 6b and the motions of the press devices 5a, 5b, 5c, and the interference curve can be utilized in the fabrication of the molds.

(3-4)

The simulation device 3 of the present embodiment is further provided with the display device 33 (example of display unit). The display device 33 displays the locus of a plurality of predetermined positions.

As a result, the worker is able to confirm interference between the feeder devices 6a, 6b and the press devices 5a, 5b, 5c by viewing the display.

(3-5)

In the simulation device 3 of the present embodiment, the transport bar 68 to which the holding tools 80 can be attached for holding the workpiece W, is provided on each of the feeder devices 6a, 6b (examples of transportation device). The plurality of predetermined positions are the positions at both ends of the transport bar 68.

As a result, the worker is able to easily confirm interference between the transport bar 68 and the press devices 5a, 5b, 5c.

(3-6)

In the simulation device 3 of the present embodiment, the feeder devices 6a, 6b (examples of transportation device) each have the rotating unit 67, the bar rotating unit 684, and the rotating unit 69 (example of tilting mechanism). The rotating unit 67, the bar rotating unit 684, and the rotating unit 69 tilt the transport bar 68 such that the heights at both ends of the transport bar 68 are different.

As a result, interference between the transport bar 68 and the press devices 5a, 5b, 5c can be easily confirmed even when the transport bar 68 of each feeder devices 6a, 6b is tilted.

(3-7)

The simulation device 3 of the present embodiment is further provided with the motion setting unit 320. The motion setting unit 320 sets the motions of the feeder devices 6a, 6b which include the tilting of the transport bar 68.

As a result, the worker is able to set the motions of the feeder devices 6a, 6b and the tilting of the transport bar 68.

(3-8)

The press system 1 of the present embodiment is provided with the press devices 5a, 5b, 5c, the feeder devices 6a, 6b (examples of transportation device), and the simulation device 3. The plurality of press devices 5a, 5b, 5c perform pressing on the workpiece W. The feeder devices 6a, 6b transport the workpiece W between the press devices 5a, 5b, 5c. The simulation device 3 has the simulation unit 353 and the coordinate acquisition unit 361. The simulation unit 353 simulates the motions of the press devices 5a, 5b, 5c and the feeder devices 6a, 6b. The coordinate acquisition unit 361 acquires a loci of a plurality of predetermined positions in the width direction Y of the feeder devices 6a, 6b from the simulation.

As a result, when the workpiece W is transported, interference with the press devices 5a, 5b, 5c can be easily confirmed from the loci of the plurality of positions in the width direction Y of the feeder devices 6a, 6b even when the movements of the feeder devices 6a, 6b are complex (for example, when tilted with respect to the width direction Y).

(3-9)

The simulation method of the present embodiment is provided with steps S60 and S90 (examples of simulation steps) and the step S70 (example of acquiring step). In the steps S60 and S90 (examples of simulation steps), the operations of the press devices 5a, 5b, 5c and the feeder devices 6a, 6b (examples of transportation device) for transporting the workpiece W between the press devices 5a, 5b, 5c are simulated. In the step S70 (example of acquiring step), the loci of a plurality of predetermined positions in the width direction Y of the feeder devices 6a, 6b is acquired from the simulation.

As a result, when the workpiece W is transported, interference with the press devices 5a, 5b, 5c can be easily confirmed from the loci of the plurality of positions in the width direction Y of the feeder devices 6a, fib even when the movements of the feeder devices 6a, 6b are complex (for example, when tilted with respect to the width direction Y).

<4. Other Embodiments>

Although an embodiment of the present invention has been described so far, the present invention is not limited to the above embodiment and various modifications may be made within the scope of the invention.

(A)

While the coordinates of the left end position P1, the center position P2, and the right end position P3 of the transport bar 68 are acquired in the above embodiment, the center position P2 can be computed from the left end position P1 and the right end position P3 and the center position may not be acquired.

In addition, because the transport bar 68 of the present embodiment has left-right symmetry, if the coordinates of either one of the left end position P1 and the right end position P3 and the coordinates of the center position P2 are acquired, the coordinates of the other end position can be calculated by computation. As a result, the center position P2 and either one of the left end position P1 and the right end position P3 may be acquired (B)

While the coordinates of the left end position P1 and the right end position P3 of the transport bar 68 are acquired in the above embodiment, the positions are not limited to these positions and the worker may set the position for acquiring the coordinates. In this case, the coordinate acquisition position setting unit may be provided in the input device 32 and may be configured so as to allow setting by the worker.

(C)

While the coordinates of the left end position P1 and the right end position P3 are acquired as the positions in which the heights in the width direction Y when the transport bar 68 is tilted are the highest position and the lowest position in the above embodiment, the positions are not limited to the left end position P1 and the right end position P3 so long as the positions are ones in which the heights in the width direction Y when the transport bar 68 is tilted are the highest position and the lowest position.

(D)

While the feeder devices 6a, 6b illustrated in FIG. 3 were used for the explanation in the above embodiment, the configuration of the feeder devices is not limited to the illustrated configuration and any feeder device that is able to transport a workpiece between the press devices 5a, 5b, 5c may be used in the tandem press line.

(E)

While an example is explained in which the heights of the left end position P1, the center position P2, and the right end position P3 are changed due to the tilting of the transport bar 68 with respect to the width direction Y in the above embodiment, the locus of the left end position P1, the center position P2, and the right end position P3 may be acquired even when the transport bar 68 is not tilted with respect to the width direction Y. In addition, when the transport bar 68 is not tilted with respect to the width direction Y, a coordinate position of only one point in the width direction Y of the transport bar 68 may be acquired.

(F)

While three press devices 5a, 5b, 5c and two feeder devices 6a, 6b are provided in the press line 2 of the above embodiment, the number of each of the devices is not limited.

(G)

While the coordinate acquisition unit 361 is provided in the computation device 36 in the above embodiment, the coordinate acquisition unit 361 may be provided in the GPU 35a.

In addition, all or some of the transport bar setting unit 351, the coordinate acquisition position setting unit 352, and the simulation unit 353 may be provided in the computation device 36.

(H)

The program of the present invention is caused by a computer to execute the operations of all or some of the steps of the abovementioned simulation method of the present invention and is a program the operates in conjunction with a computer.

The recording medium of the present invention is a recording medium in which is recorded a program that is caused by a computer to execute the operations all or some of the steps of the abovementioned simulation method of the present invention, and is a recording medium that can be read by a computer so that the read program executes the operations in conjunction with the computer.

One utility mode of the program of the present invention may be recorded in a storage medium such as a computer-readable ROM and may be a mode that operates in conjunction with the computer.

Moreover, one utility mode of the program of the present invention may be a mode that is propagated through a transmission medium such as the Internet or in a transmission medium such as light or radio waves, is computer readable, and is operated in conjunction with a computer.

Moreover, the abovementioned computer of the present invention is not limited to pure hardware such as a CPU, and may be firmware, an OS, or an item that includes peripheral apparatuses. Furthermore, the configurations of the present invention may be realized by software or may be realized by hardware.

The simulation device of the present invention demonstrates the effect of being able to easily confirm interference and is useful for tandem press lines and the like.

What is claimed is:

1. A simulation device comprising:
    a simulating unit configured to simulate operations of a plurality of press devices for performing pressing on a workpiece and operation of a transport device for transporting the workpiece between the plurality of press devices in a transport direction, the transport device including a transport bar and a tilting mechanism, the transport bar being disposed along a width direction perpendicular to the transport direction and having a holding tool removably attached thereto to hold the workpiece, and the tilting mechanism being configured to tilt the transport bar so that a height of a first end of the transport bar is different from a height of a second end of the transport bar, the first end and the second end being spaced apart in the width direction, and
    an acquiring unit configured to acquire a locus of each of a plurality of predetermined positions in the width direction of the transport device from simulation, the plurality of predetermined positions including a first position located at the first end of the transport bar and a second position located at the second end of the transport bar.

2. The simulation device according to claim 1, wherein the plurality of predetermined positions include positions at both ends in the width direction of the transport device.

3. The simulation device according to claim 1, further comprising
    an output unit configured to externally outputs the locus of the plurality of predetermined positions.

4. The simulation device according to claim 1, further comprising
    a display unit configured to display the locus of the plurality of predetermined positions.

5. The simulation device according to claim 1, further comprising
    a motion setting unit configured to set a motion of the transport device, the motion including the tilting of the transport bar.

6. A press system comprising:

a plurality of press devices configured to press a workpiece, a transport device configured to transport the workpiece between the plurality of press devices in a transport direction, the transport device including a transport bar and a tilting mechanism, the transport bar being disposed along a width direction perpendicular to the transport direction and having a holding tool removably attached thereto to hold the workpiece, and the tilting mechanism being configured to tilt the transport bar so that a height of a first end of the transport bar is different from a height of a second end of the transport bar, the first end and the second end being spaced apart in the width direction, and a simulation device including a simulation unit configured to simulate operations of the plurality of press devices and operation of the transport device, and an acquiring unit configured to acquire a locus of each of a plurality of predetermined positions in the width direction of the transport device from simulation, the plurality of predetermined positions including a first position located at the first end of the transport bar and a second position located at the second end of the transport bar.

7. A simulation method comprising:

a simulating step for simulating operations of a plurality of press devices for performing pressing on a workpiece and operation of a transport device for transporting the workpiece between the plurality of press devices in a transport direction, the transport device including a transport bar and a tilting mechanism, the transport bar being disposed along a width direction perpendicular to the transport direction and having a holding tool removably attached thereto to hold the workpiece, and the tilting mechanism being configured to tilt the transport bar so that a height of a first end of the transport bar is different from a height of a second end of the transport bar, the first end and the second end being spaced apart in the width direction, and an acquiring step for acquiring a locus of each of a plurality of predetermined positions in the width direction of the transport device from simulation, the plurality of predetermined positions including a first position located at the first end of the transport bar and a second position located at the second end of the transport bar.

8. The press system according to claim 6, wherein the simulation device includes a computer configured to execute a program the program including a simulating step for simulating the operations of the plurality of press devices and the operation of the transport device, and an acquiring step for acquiring the locus of each of the plurality of predetermined positions.

9. The press system according to claim 8, wherein the simulation device further includes a recording medium that records the program and is readable by the computer.

10. The simulation device according to claim 2, further comprising an output unit configured to externally outputs the locus of the plurality of predetermined positions.

11. The simulation device according to claim 10, further comprising a display unit configured to display the locus of the plurality of predetermined positions.

12. A recording medium onto which a program executable by a computer is recorded, the recording medium being a physical recording medium that is readable by the computer, and the program including a simulating step for simulating operations of a plurality of press devices for performing pressing on a workpiece and operation of a transport device for transporting the workpiece between the plurality of press devices in a transport direction, the transport device including a transport bar and a tilting mechanism, the transport bar being disposed along a width direction perpendicular to the transport direction and having a holding tool removably attached thereto to hold the workpiece, and the tilting mechanism being configured to tilt the transport bar so that a height of a first end of the transport bar is different from a height of a second end of the transport bar, the first end and the second end being spaced apart in the width direction, and an acquiring step for acquiring a locus of each of a plurality of predetermined positions in the width direction of the transport device from simulation, the plurality of predetermined positions including a first position located at the first end of the transport bar and a second position located at the second end of the transport bar.

13. The recording medium according to claim 12, wherein the physical recording medium is a storage medium.

14. The recording medium according to claim 13, wherein the storage medium is a random access memory.

* * * * *